Aug. 15, 1950     S. E. RICHESON     2,519,198
COFFEE GRINDING MACHINE
Filed Nov. 18, 1944     2 Sheets-Sheet 1

SANFORD E. RICHESON
INVENTOR

ATTORNEY

Aug. 15, 1950      S. E. RICHESON      2,519,198
COFFEE GRINDING MACHINE

Filed Nov. 18, 1944      2 Sheets-Sheet 2

SANFORD E. RICHESON
INVENTOR

BY John P. O'Donov
ATTORNEY

Patented Aug. 15, 1950

2,519,198

UNITED STATES PATENT OFFICE 2,519,198

COFFEE GRINDING MACHINE

Sanford E. Richeson, Brooklyn, N. Y.

Application November 18, 1944, Serial No. 564,073

4 Claims. (Cl. 241—162)

My invention relates to coffee grinding machines and has particular reference to machines operated by a motor.

One of the objects of my invention is to provide a coffee grinding machine in which the coffee beans are ground by teeth in a clearance formed between a ribbed rotor on the motor shaft and a grooved block supported above the rotor, means being provided for adjusting the clearance for obtaining coffee grind of a desired fineness.

Another object of my invention is to provide a coffee grinding machine of an attractive and compact appearance, which will be inexpensive to build and easy to operate.

My invention is more fully described in the accompanying specification and drawings in which.

Figure 1:
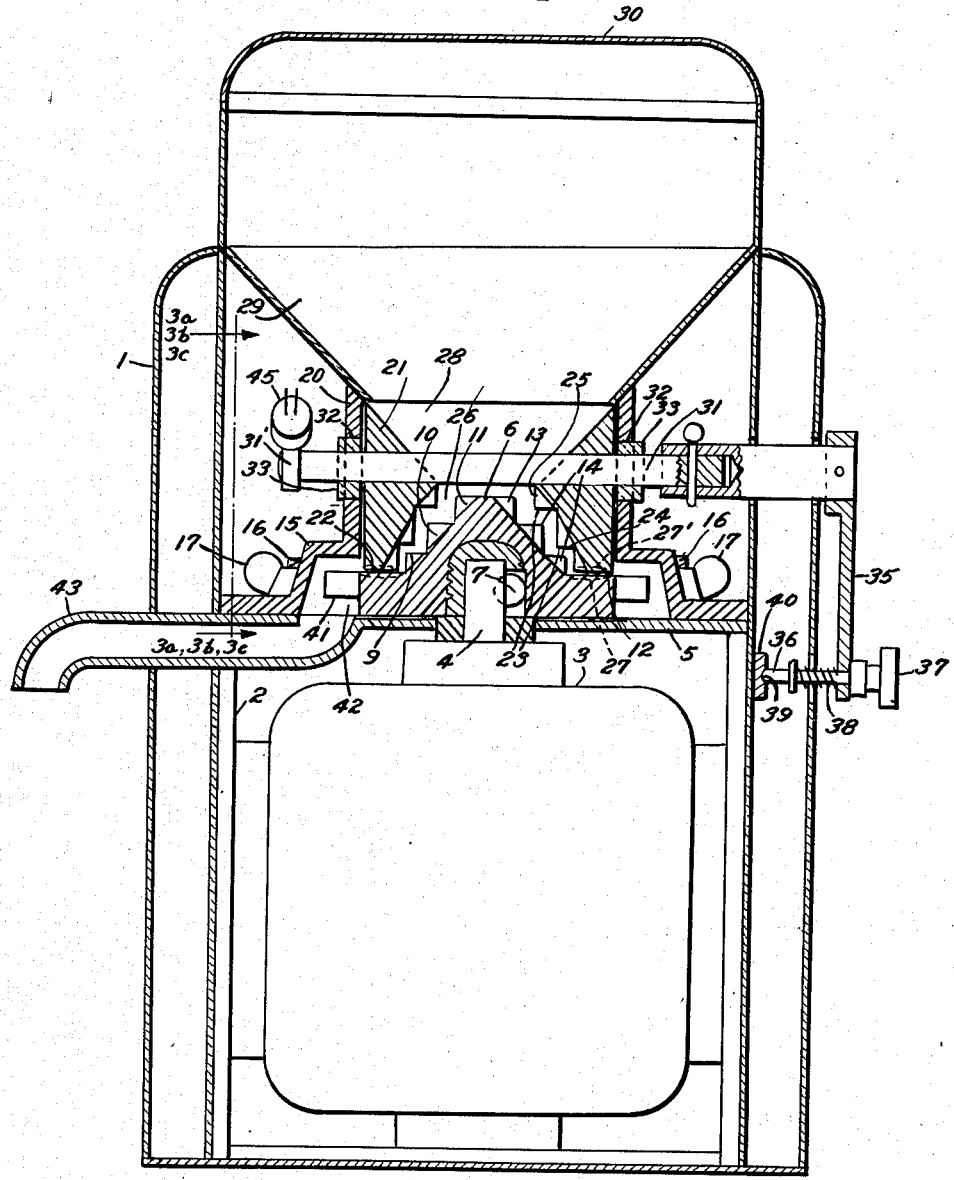
Fig. 1 is a sectional elevational view of my coffee grinding machine.

My coffee grinding machine comprises a housing 1 for a frame 2, a vertical motor 3 being mounted in the frame with a shaft 4 extending on top. A plate cover 5 is provided on top of the frame, the shaft extending above the cover. A rotor 6 is mounted on the shaft and is held by a shearing disc 7 preferably made of copper or similar relatively soft material so that it will break and release the rotor from the shaft when resistance to the rotation of the rotor increases considerably above the normal as, for instance, if a foreign particle should happen to be with the coffee beans.

The rotor is provided with several concentric shoulders or annular rib portions 9, 10, 11 rising from an annular shelf 12 toward the center of the rotor. Grooves 13 are cut in the shoulders, forming teeth 14.

A casing 15 is supported on the plate and is removably held in place by studs 16 with wing nuts 17. The casing is provided with a tubular extension 20 on top in which slides an upper cylindrical portion of a block or stator 21. The block has a shelf 22 at the bottom opposite the block shelf 12 and a plurality of annular recesses, forming ribs or shoulders 23. Grooves 24 are cut in the shoulders forming teeth 25. The vertical and horizontal sides of the shoulder correspond to the similar sides of the rotor shoulders, forming clearances 26 which progressively decrease from the top to the bottom. The uppermost clearance is sufficiently wide to admit coffee beans, and the clearances gradually decrease until a very fine clearance is obtained between the shelves of the rotor and casing. The shelf 12 is provided with arcuate grooves 27, extending in generally radial directions and terminating at a short distance from the periphery of the rotor. Similar grooves 27" are provided in the shelf 22 of the block 21.

Figure 2:
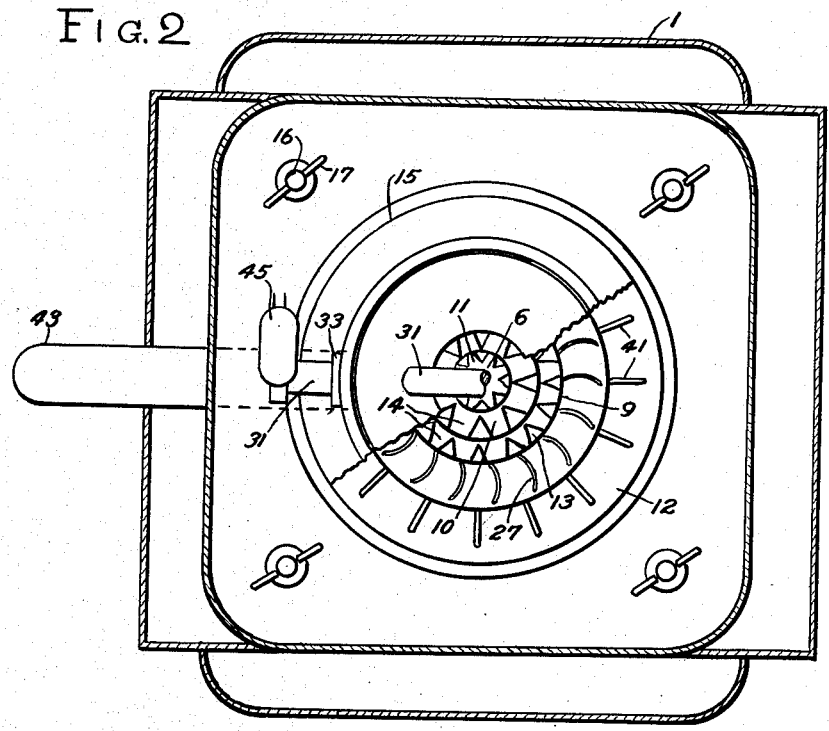
Fig. 2 is a top plan view of the same partly in section.

The upper portion of the block or stator 21 is provided with a funnel 28, forming a continuation of a hopper 29 for coffee beans, supported on top of the housing 1 and covered on top by a lid 30. The housing and the hopper with its lid may be preferably made of an ornamental shape as shown in Fig. 4. The block is supported in the casing by a shaft or rod 31, passing through the sides of the block without clearance and also through slots 32 in the tubular extension 20 of casing 15 and openings in the right hand wall of frame or housing 1. Shaft 31 supports two eccentrics 33 each engaging the respective slot 32. As can best be seen on Figs. 3a, 3b and 3c, slots 32 have a rectangular shape extending in circumferential direction. Eccentrics 33 are so dimensioned that they just fill the slots in vertical direction and can be rotated within the slots by reason of the circumferential extension thereof. The openings in the walls of housing 1 have just sufficient clearance to permit a slight vertical movement of shaft 31 relative to housing 1 and casing extension 20. As will be apparent, rotation of shaft 31 in unison with eccentrics 33 will cause a corresponding slight lifting or lowering of shaft 31 relative to casing extension 20 and, hence, also of stator 21 relative to rotor 6. It will further be apparent that coffee will be ground finest when the stator is closest to the rotor and coarsest when the stator is most remote from the rotor. Figs. 1 and 2 show block or stator 21 in a position for medium fine grinding.

Figure 3A:
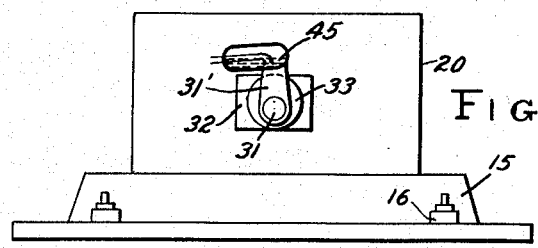
Figs. 3a, 3b and 3c are side views of the block casing (see from the left side of Fig. 1 after removal of the housing and taken on the section line shown in Fig. 1) showing the adjustment means for the block or stator in different positions of adjustment.
Figure 3B:
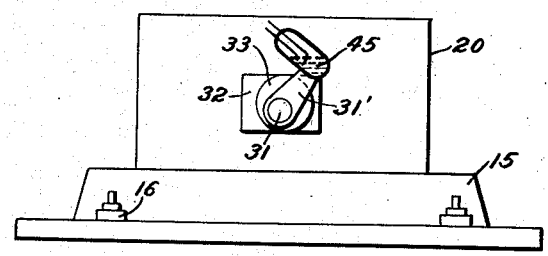
Figure 4:
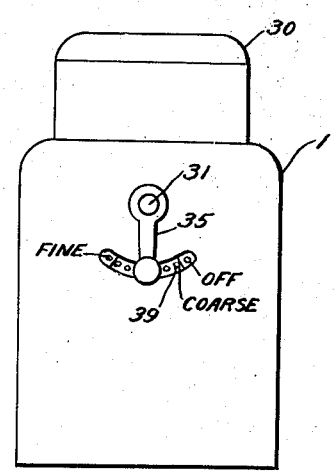
Fig. 4 is an elevational view of my machine on a reduced scale, showing manual adjustment for regulating the fineness of the grind.
Figure 3C:
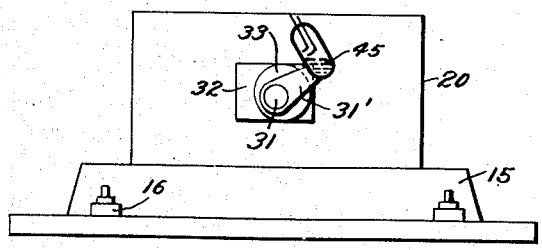

Fig. 3a shows the eccentrics in a position for fine grinding; Fig. 3c in the off position; and Fig. 3b in a position for coarse grinding. The end of the shaft 31 extends outside the housing 1 and is provided with a handle 35 for its manual rotation. The handle is provided with a sliding pin 36 having a thumb head 37 and a spring 38, urging the pin to the left and, into engagement with holes 39 in a plate 40 on the frame 2. Different holes correspond to the different fineness of the coffee grind. Fig. 4 shows handle 35 in a position for medium fine grinding corresponding to the handle position of Fig. 1. The right hand limit position of the handle is marked as "off" position. Accordingly, the left hand limit position of the handle is marked "fine" grinding position and the intermediate position next to the said position is marked "coarse" grinding position. The other intermediate positions may be visualized as producing a medium fine grind.

The rotor 6 is provided at the periphery with radial vanes 41, functioning as a fan or blower when the rotor is operated, for creating suction in the clearances and drawing the ground coffee therefrom into an annular chamber 42 formed under the casing 15. A spout 43 extends from the casing to the outside of the housing for discharging the ground coffee.

A mercury switch 45 of conventional design and therefore diametrically shown is secured to the end of the shaft 31 by means of an arm 31' and is so adjusted that it will turn in unison with shaft 31 and disconnect the motor when the handle 35 is turned into the position corresponding to Fig. 3c and indicated in Fig. 4 as right hand limit position. The switch will close the motor circuit as soon as the pin 36 is placed in the first operating position or hole 39, in which position of the shaft and cam the clearances are the largest for producing the coarsest grind. The motor therefor can be easily started, the frictional resistance being the lowest. This arrangement has an added advantage in that the operator must question as to the kind of grind wanted because to start the motor he must operate the same handle which controls the coarseness of the grind.

What is claimed as new and desired to be secured by Letters Patent is:

1. A coffee grinding machine comprising a frame, a vertical motor in the frame with a shaft extending above the frame; a rotor mounted at the end of the motor shaft, the rotor having a substantially horizontal annular shelf portion at its periphery and a raised central position, ribs formed on the central portion; a tubular casing on the top of the frame having a substantially cylindrical upper portion; a cylindrical block slidably supported in the cylindrical portion of the casing, the block having a plurality of grooves corresponding to the ribs of the rotor and forming annular clearances with the rotor of progressively decreasing width toward the peripheral shelf portion of the rotor, the lower portion of the block having an approximately horizontal shelf above the rotor shelf, the lower shelves of the block and of the rotor having grooves facing each other and extending in approximately radial direction, said grooves terminating at a distance from the periphery of the block and the rotor respectively.

2. A coffee grinding machine comprising a frame; a vertical motor in the frame, having a shaft extending on top of the motor; a rotor on the shaft having a plurality of ribs; a casing supported on top of the frame forming a chamber around the rotor and having an upper cylindrical portion; a cylindrical block slidably fitted in the cylindrical portion having ribs cooperating with the rotor ribs; a horizontal shaft passing through the block and through the cylindrical casing portion; eccentrics on the shaft engaging enlarged holes in the tubular casing portions; and a handle for rotating the shaft in unison with the eccentrics thereby varying the vertical position of the block relative to the rotor.

3. A coffee grinding machine comprising a frame; a vertical motor in the frame having a shaft extending on top of the motor; a rotor on the shaft having a plurality of ribs; a casing supported on top of the frame forming a chamber around the rotor and having an upper cylindrical portion; a cylindrical block slidably fitted in the cylindrical portion and having ribs cooperating with the rotor ribs, a horizontal shaft supporting the block and extending at both sides thereof, said shaft ends being passed through corresponding holes in said cylindrical casing portion and said frame; an eccentric mounted on each shaft end for rotation in unison with the shaft, each eccentric being positioned to engage the corresponding hole in the cylindrical casing portion, said casing holes being circumferentially extended and arranged to permit rotation of the eccentrices therein, and said frame holes being shaped to permit a slight vertical displacement of the shaft relative to the frame and the cylindrical casing portion; and a handle for rotating the shaft in unison with the eccentrics, thereby varying the vertical position of the block relative to the rotor.

4. A coffee grinding machine as described in claim 3, in combination with a member having spaced detents therein to detain said handle in selected angular positions.

SANFORD E. RICHESON.

REFERENCES CITED

The following references are of record in the file of this patent:

UNITED STATES PATENTS

| Number | Name | Date |
|---|---|---|
| 24,058 | Russell | May 17, 1859 |
| 104,537 | Baker | June 21, 1870 |
| 110,397 | Rusk | Dec. 20, 1870 |
| 237,320 | Raymond | Feb. 1, 1881 |
| 249,106 | Schneider | Nov. 1, 1881 |
| 250,432 | Forster | Dec. 6, 1881 |
| 955,463 | Jones | Apr. 19, 1910 |
| 1,502,675 | Johnston | July 29, 1924 |
| 1,987,941 | Mathews | Jan. 15, 1935 |
| 2,133,756 | Rodgers | Oct. 18, 1938 |

FOREIGN PATENTS

| Number | Country | Date |
|---|---|---|
| 788,852 | France | Aug. 5, 1935 |
| 20,279 | Germany | Nov. 30, 1882 |
| 110,983 | Switzerland | Nov. 16, 1925 |